Dec. 21, 1954     E. C. WILLIAMS     2,697,365
POWER TRANSMISSION EQUIPMENT

Filed June 16, 1950     4 Sheets-Sheet 1

EARL C. WILLIAMS
INVENTOR

BY
William G. Landwier
AGENT

Dec. 21, 1954   E. C. WILLIAMS   2,697,365
POWER TRANSMISSION EQUIPMENT
Filed June 16, 1950   4 Sheets-Sheet 2

EARL C. WILLIAMS
INVENTOR

BY *William G. Landwier*
AGENT

Dec. 21, 1954     E. C. WILLIAMS     2,697,365
POWER TRANSMISSION EQUIPMENT

Filed June 16, 1950     4 Sheets-Sheet 4

EARL C. WILLIAMS
INVENTOR

BY
William G. Landivier
AGENT

United States Patent Office 2,697,365
Patented Dec. 21, 1954

2,697,365

POWER TRANSMISSION EQUIPMENT

Earl C. Williams, Syracuse, N. Y.

Application June 16, 1950, Serial No. 168,427

19 Claims. (Cl. 74—681)

This invention relates to power transmission equipment and more particularly to a mechanism for producing positive infinitely variable speed changes in a power transmission system.

A need for a simple, positive, infinitely variable speed changing mechanism has long been felt in industries such as the machine tool, textile, paper-making, leather and numerous other industries. It is important in many machines, as illustrated by the familiar change gear box in a metal working lathe, that the feed changing mechanism be positive in its transmission of rotary motion. In machines, such as the aforementioned lathe, a speed changing mechanism which depends upon friction to transmit the necessary power is very impractical since a slight slippage cannot be tolerated.

It is an object of this invention to provide a speed changing mechanism which is infinitely variable within the range of speeds for which it is designed.

It is a further object of this invention to provide a speed changing mechanism which is capable of being compactly designed for a particular installation with positive engagement between all members concerned with transmission of power through the device.

It is a further object of this invention to provide a mechanism wherein the ratio of rotation between two shafts is infinitely adjustable and can be maintained without variation regardless of the load being transmitted.

Other objects of the invention will appear hereinafter, the novel features and combinations being set forth in the appended claims.

Generally described, the present invention comprises within a housing at least two conical gear members having uniformly spaced teeth generated in a constant lead spiral path on the conical surface of each of said conical gear members. It is to be noted that one of these members has a right hand and the other a left hand spiral path. The conical gear members are in spaced relationship with each other, and a compensation member interposed therebetween in engagement therewith. The axial position of said compensation member with respect to the conical gear members determines the speed ratio obtained between the input and output members.

A preferred embodiment of the invention has been chosen for purposes of illustration and description, and is shown in the accompanying drawings forming a part of the specification, wherein like figures refer to like parts wherever they occur:

Figure 1:
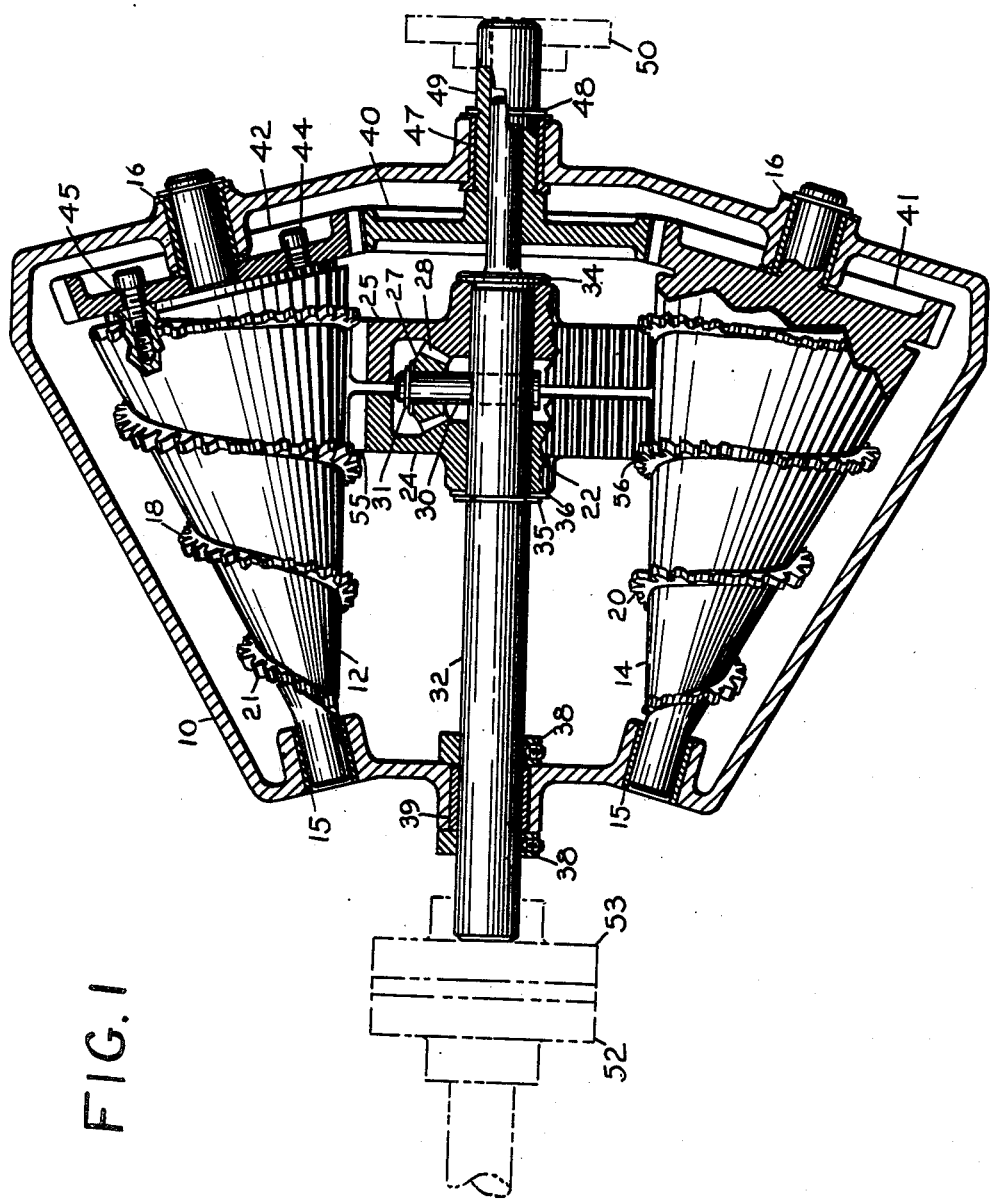
Figure 1 is a cross-sectional view of the basic elements of the invention.

With reference to Figure 1, basic elements of the invention are shown in operating position in a simple embodiment of the invention. A housing 10 is adapted to support the elements of the invention. A pair of conical members 12 and 14 are in spaced angular relationship and are rotatably mounted in suitable bearing members 15 and 16. The conical members 12 and 14 have generated on their conical surfaces spiral paths of teeth 18 and 20, respectively, said spiral paths having constant leads along lines parallel with the conical surfaces, i. e., constant rate of advance per revolution. It is to be noted that the spirals of the spiral paths of teeth 18 and 20 are of opposite hand. The teeth 21, preferably of the crowned spur type, in these paths are equally spaced, but with the constantly changing diameter along the spiral path, it is understood that the number of teeth per inch of circumference at the various diameters along the cone will vary uniformly. This is true of both conical members.

A differential compensation member 22 is centrally disposed in the housing 10 and in an engageable position between the conical members 12 and 14. Said compensation member 22 is constructed with adjacent spur gear members 24 and 25 differentially connected by means of a differential pinion 27 in engagement with a bevel gear 28 generated on facing surfaces of each of said spur gear members 24 and 25. Said differential pinion 27 is rotatably mounted on a drive pin 30 and retained in place thereon by a retaining ring 31. Said drive pin 30 is rigidly affixed to a differential shaft 32. Differential or combined movement of the spur gear members 24 and 25 will be transferred to said differential shaft 32 since the spur gear members 24 and 25 are positioned in a fixed axial position on the differential shaft 32 by a retaining means consisting of a shoulder 34 formed on the differential shaft 32 on one side and a retaining ring 35 and washer 36 at the other side of said compensation member 22.

The spur gear members are engageable with the spiral toothed paths 18 and 20 along the conical surfaces of said conical members 12 and 14 whose lines of engagement with the spur members are parallel with each other and parallel with the central axis of the invention.

Locking collars 38 are adjustably positionable on the differential shaft 32 on each side of the bearing 39 in order to lock said shaft 32 in a position which will properly locate the compensation member 22 with respect to the conical members 12 and 14 to obtain the desired speed.

The conical members 12 and 14 are positively connected and operably engaged through a central bevel gear 40, cone bevel gear 41 and adjustable cone bevel gear 42, to produce relatively opposite rotational direction with respect to each other. Adjustable cone bevel gear 42 is adjustably positionable to conical member 12 to obtain initial adjustment by means of releasable cap screws 44 mounted in circumferentially slotted openings 45 in said adjustable bevel gear 42. The centrally disposed bevel gear 40 is adapted to support the differential shaft 32 and is rotatably mounted in a bevel bearing member 47 and axially positioned by said bearing member 47 and snap retaining ring 48. An extended hub portion 49 of said central bevel gear 40 is adapted to receive some means of attachment 50 (not part of this invention), to associated equipment to either drive or be driven by said hub portion 49. Portions of mechanism suitable for connecting the invention to sources of power or to driven members are not part of this invention but are indicated by coupling members 52 and 53.

It should be noted that the total width of the compensation member, i. e., the face width of each spur gear 24 and 25 plus the clearance space therebetween, should be approximately equal to the lead of the spiral paths of teeth 18 and 20 along the conical surface of the conical members 12 and 14.

In operation, the ratio of the relative rotation between the differential shaft 32 and extended hub 49 is determined by the relative axial position of the compensator 22 with respect to the conical members 12 and 14. During operation, the spiral toothed path of one conical member, such as at 55, should be entering engagement with the compensator just as the opposite spiral toothed path, such as at 56, is leaving engagement with said compensator (for counterclockwise rotation of the central bevel gear 40 when viewed from this end). Experience has shown that the alignment of points of identical diameters on the conical members 12 and 14 with respect to each other in planes perpendicular to the central axis of the compensation member 22 should be staggered or offset by an amount equal to approximately one-half of the face width of the spiral toothed path on the conical members.

Figures 2, 3:
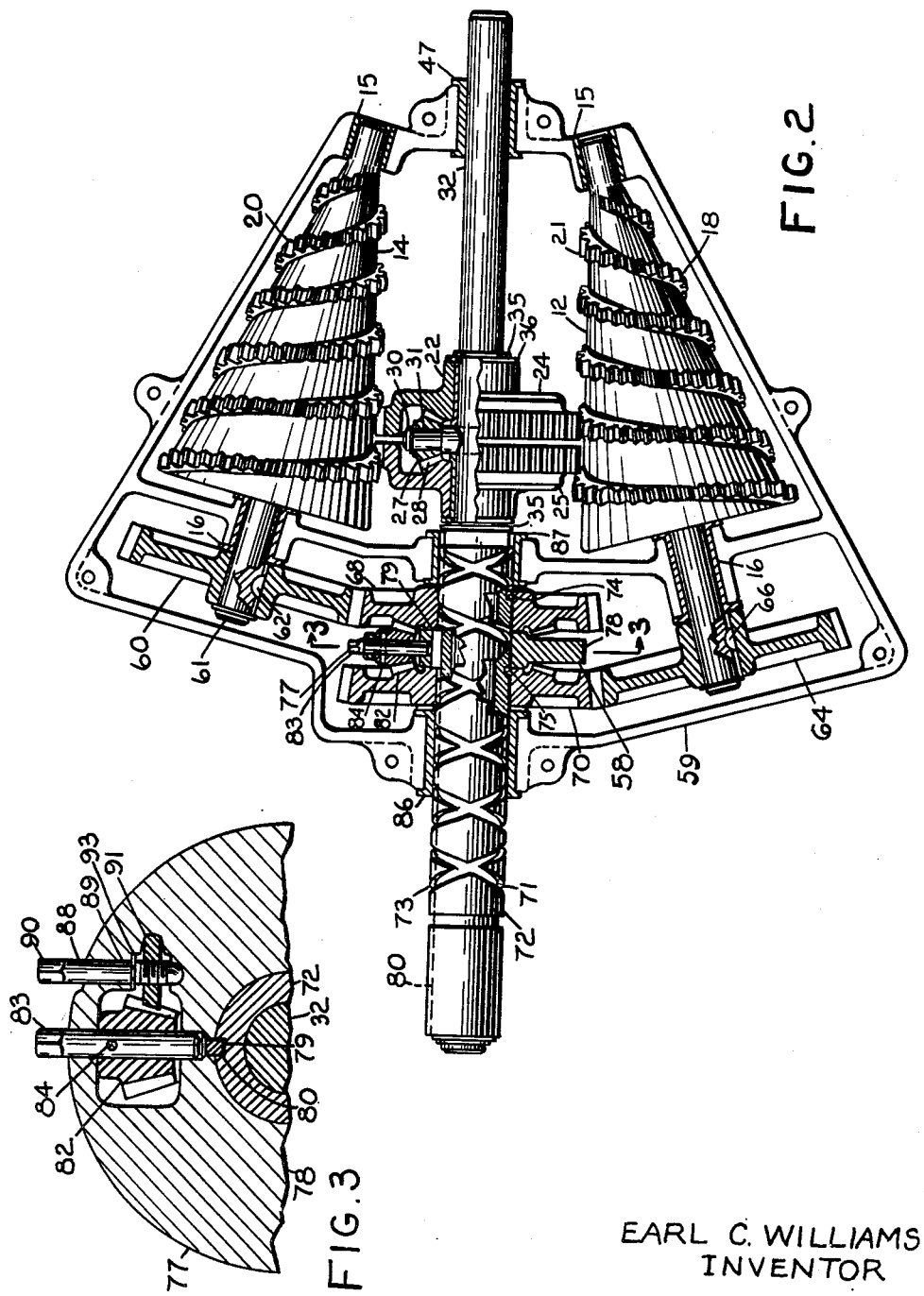
Figure 2 is a cross-sectional, elevational view of an alternative embodiment of the invention.
Figure 3 is a cross-sectional view of a differential adjustment arrangement taken along line 3—3 of Figure 2.

With reference to Figure 2, there is illustrated an embodiment of the invention having an adjusting means which facilitates adjustment of the components of the invention described with reference to Figure 1 to obtain a variable ratio of relative rotation between the differential shaft and the central bevel gear arrangement, without disassembly or disengagement of the members. Whereas in Figure 1, the conical elements of the invention are shown directly interconnected by the bevel gears 40, 51 and 42, adjustment means 48 illustrated in Figure 2 is introduced into the system to effect a means of adjusting the position of the compensation member 22 along the central axis of the invention when rotational input to the invention is discontinued. A split or two-piece housing 59 is shown with one-half removed to show the various components, some in section.

The function of the major components of the invention, such as the conical gear elements, compensation member, etc., in Figure 2 have been described with reference to Figure 1.

In addition, a bevel gear 60 is keyed to an extended cone shaft 61 by key 62, and shaft 61 is in turn rigidly attached to the conical member 14. A bevel gear 64 is keyed to shaft 65 by a key 66, and shaft 65 is in turn rigidly attached to the conical member 12. Said bevel gear 60 is engaged with a differential bevel gear 68 of the adjustment means 58. Said bevel gear 64 is engaged with the differential bevel gear 70 of the adjustment means 58. The adjusting means includes differential keyways 71 and 73 on the surface of a tubular member 72, said differential keyways 71 and 73 being both right and left hand. Bevel gears 68 and 70 have integral keys 74 and 75, respectively, which are slidable in respective opposite hand keyways 71 and 73. An adjustment control means 77 of said adjustment means 58 consists of a pinion supporting element 78 keyed by a sliding key 79 operable in a keyway 80 cut on the tubular member 72 parallel with the center line of the unit. Control bevel pinion 82 is rigidly attached to a spindle 83 by a drive pin 84, said spindle being rotatable in said pinion supporting element 78, and said spindle being squared or otherwise designed to receive a key or wrench element (not shown) so that the spindle 83 and pinion 82 can be rotated by the operator to produce opposite rotation of bevel gear elements 68 and 70, and in turn to effect axial movement of the tubular member 72, and to effect relatively opposite rotation of the conical members through their respective bevel gears 60 and 64. Axial movement of the tubular member 72 produces axial movement to the differential shaft 32, and compensation member 22, since said tubular member 72 is freely rotatable but axially locked by retaining rings 35 to said differential shaft 32. The adjustment means is axially fixed between bearing members 86 and 87, which support said tubular member 72 in the housing 59. It should be noted that to effect axial movement of the compensation member 22 and corresponding movement of the spiral tooth paths 18 and 20 during adjustment, the conical member 12 with a left hand spiral path should be connected through bevel gears 64 and 70 to the right hand keyway 73 of said tubular member 72. Conical member 14 with a right hand spiral path should be connected through bevel gears 60 and 68 to the left hand keyway 71 of said tubular member 72. Rotary motion supplied by a motive source (not shown) to the extended tubular member 72 is reduced when taken from the extended differential shaft 32, and vice versa.

Figure 3 is an enlarged cross-section of the adjusting means showing a pinion locking arrangement 88 adapted to lock the control bevel pinion 82 to prevent its rotation when rotative power is being transmitted by the invention and to be releasable by the operator when it is desired to adjust the position of the compensator means 22 with respect to the conical members 12 and 14. The pinion locking arrangement 88 includes a locking screw 89 squared as at 90 to receive a key or wrench element (not shown), and a brake plate 91 pivotally mounted in the pinion supporting element 78. Said brake plate 91 is adapted to threadedly receive a threaded portion of said locking screw 89 in pivotal relationship therewith. Movement of the locking screw 89 in one direction will force said brake plate 91 into locking or braking engagement with the pinion 82 while a reverse movement will release said brake plate 91 from said pinion 82 to permit rotation of said pinion 82 so that adjustment of the location of the compensator member 22 may be effected. Locking ring 93 is mounted on said locking screw 89 to retain said shaft in position in the pinion supporting element 78.

The retaining members illustrated in the various embodiments of the invention to prevent axial movement of shaft members or the like, preferably are retaining rings well known in the art, in direct contact with the retained members or with a washer therebetween.

Figure 4:
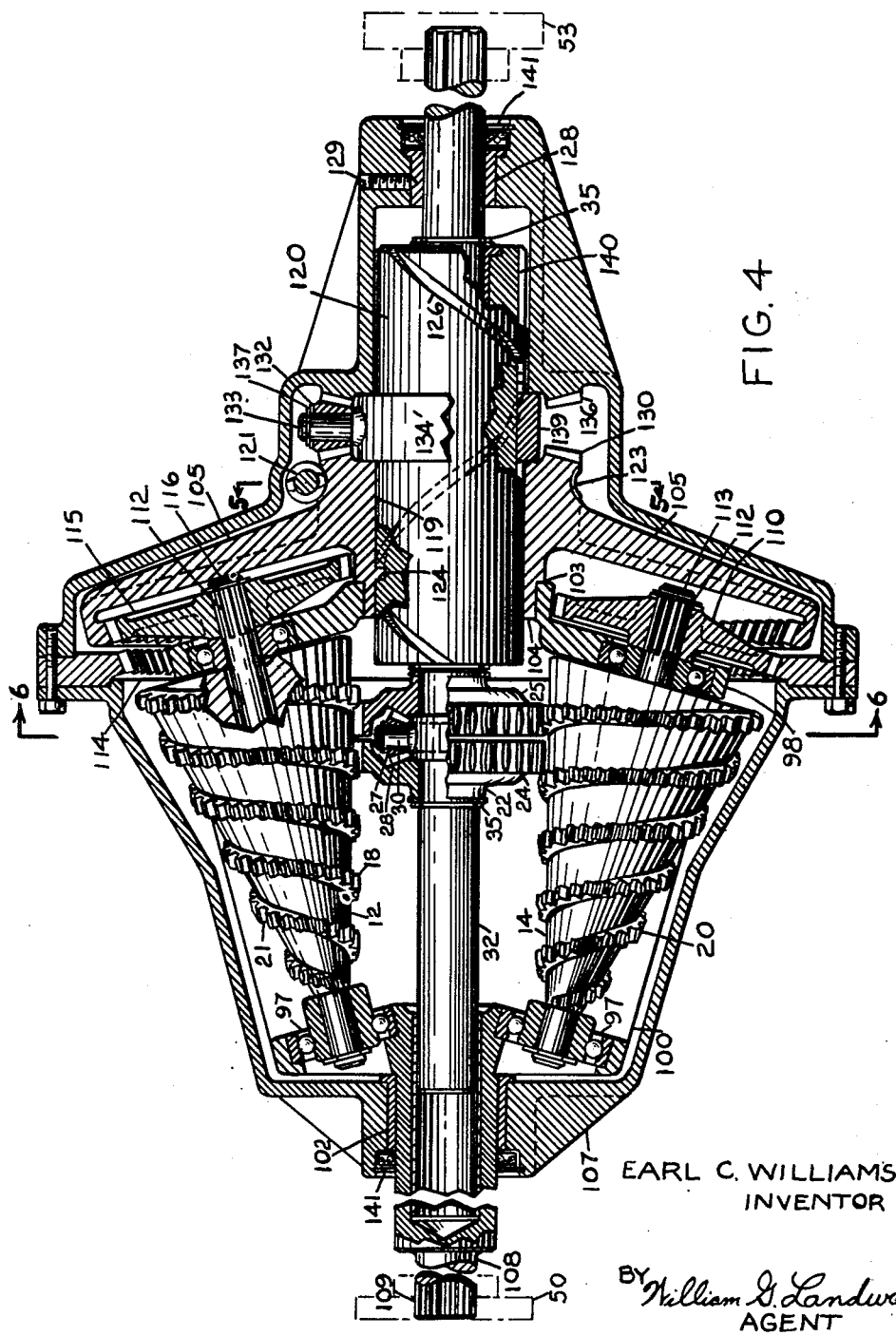
Figure 4 is an elevational view, partly in section, of a planetary alternative embodiment of the invention.

With reference to Figure 4, there is illustrated an epicyclic embodiment of the invention having an adjusting means which permits speed adjustment of the invention while the unit is in operation.

At least two conical members 12 and 14 are each rotatably mounted in anti-friction bearing members 97 and 98, and disposed in spaced relationship about the central axis and the compensation member 22. Said conical members 12 and 14 are supported by a carrier member 100 which is in turn rotatably supported at one end in a bearing member 102, and at the opposite end by a bearing surface 103 formed in this embodiment on a hub 104 of an adjustable internal bevel ring gear 105. Said bearing member 102 is mounted in a portion of a housing 107. A stub shaft extension 108 is in this embodiment an integral part of the carrier member 100 which extends through the bearing member 102. Said stub shaft extension 108 is adapted by splines 109 to be connected to other mechanisms, not part of this invention, in order to either receive therefrom or impart rotary motion thereto.

Bevel gear 110 is shown in this embodiment to be splined to receive splines 112 on shaft 113, which is rigidly attached to the conical member 14. Bevel gear 110 is in operable engagement with a stationary internal bevel ring gear 114 which is in turn rigidly attached to the housing 107. Bevel gear 115 is shown in this embodiment to be splined to receive splines 112 on shaft 116 which is rigidly attached to the conical member 12. Said bevel gear 115 is in operable engagement with an adjustable internal bevel ring gear 118 which is supported by a suitable bearing surface 119 upon a tubular adjusting member 120. Said adjustable internal bevel ring gear 118 is rotatably positionable with respect to the housing 107 by means of a worm 121 mounted in said housing 107 and operable with a worm wheel 123 formed on said adjustable internal bevel ring gear 105. The ratio of bevel gear 110 to the stationary internal bevel ring gear 114 is equal to the ratio of bevel gear 115 to the adjustable internal bevel ring gear 118. The adjustable internal bevel ring gear 118 is provided with a spiral key member 124 as an integral part thereof which is operable in a spiral keyway 126 generated in the surface of the tubular adjusting member 120. Rotational adjustment of the adjustable internal bevel ring gear 118 produces axial movement or adjustment of the tubular adjusting member 120, differential shaft 32, and the compensator member 22. Said tubular adjusting member 120 is axially fixed, but rotatably mounted on the differential shaft 32 by retaining members such as retaining rings 35. Said differential shaft 32 is supported at its extremities by a bearing member 128 and the carrier member 100. Said bearing member 128 is held in place in the housing 107 by a set screw 129. The differential shaft 32 supports and is connected to the compensation member 22 as described hereinabove with reference to Figures 1 and 2, to permit axial adjustment of said compensation member with respect to the conical members 12 and 14.

The adjustable internal bevel ring gear member 105 is provided with a central bevel gear 130 operable with a bevel pinion 132 rotatably mounted on a pin extension 133 of yoke 134. Said pinion 132 is also operably engaged with a bevel gear 136 which is integral with said housing 107. The bevel pinion 132 is located in position on the pin extension 133 by a retaining ring 137 anchored in a groove in said pin 133. The yoke 134 is axially locked in place between the housing 107 and the adjustable internal bevel ring gear 105 and a key 139 which is integral with said yoke 134 is slidable in a keyway 140 in the tubular adjusting member 120.

The lead of the spiral keyway 126 on the tubular adjusting member 120 bears the same ratio relationship with the spiral tooth path on a conical gear member 12 as the ratio of either the adjustable or stationary internal bevel ring gear (118 or 114) to its mating bevel gear (115 or 116).

Adjustment of this embodiment is made by altering the angular position of the adjustable internal bevel ring gear 118 with respect to the stationary bevel ring gear 114, said positional adjustment causing rotation of the conical gears 12 and 14 and a corresponding axial adjustment of the compensation member 22 with respect to the conical gear members. Seal members 141 are provided to retain lubricant in this embodiment.

Figure 5:
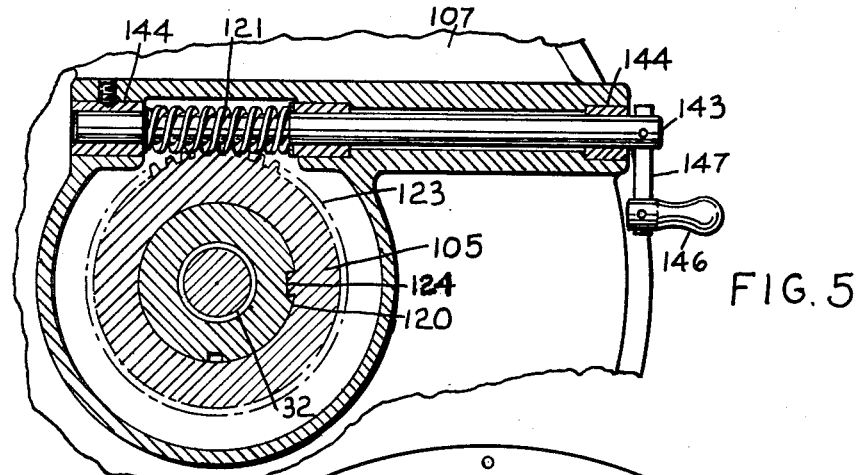
Figure 5 is a cross-sectional view of the adjusting arrangement of the planetary embodiment illustrated in Figure 4, and is taken along line 5—5 of Figure 4.

Figure 5, a cross-sectional view taken along the line 5—5 of Figure 4, illustrates the operation of the adjustment means of the adjustable internal bevel ring gear 105. A worm gear shaft 143 is rotatably mounted in bearing members 144 and rigidly attached to a worm 121 which is in operable engagement with a worm wheel 123. Said worm wheel 123 is generated on the adjustable internal bevel ring gear member 118. Said worm shaft 143 is operable by external means such as a manually operable handle 146 which is fixed to a lever 147 and adapted to be manually rotated by the operator. The bearing members 144 are mounted in a portion of the housing member 107.

Figure 6:
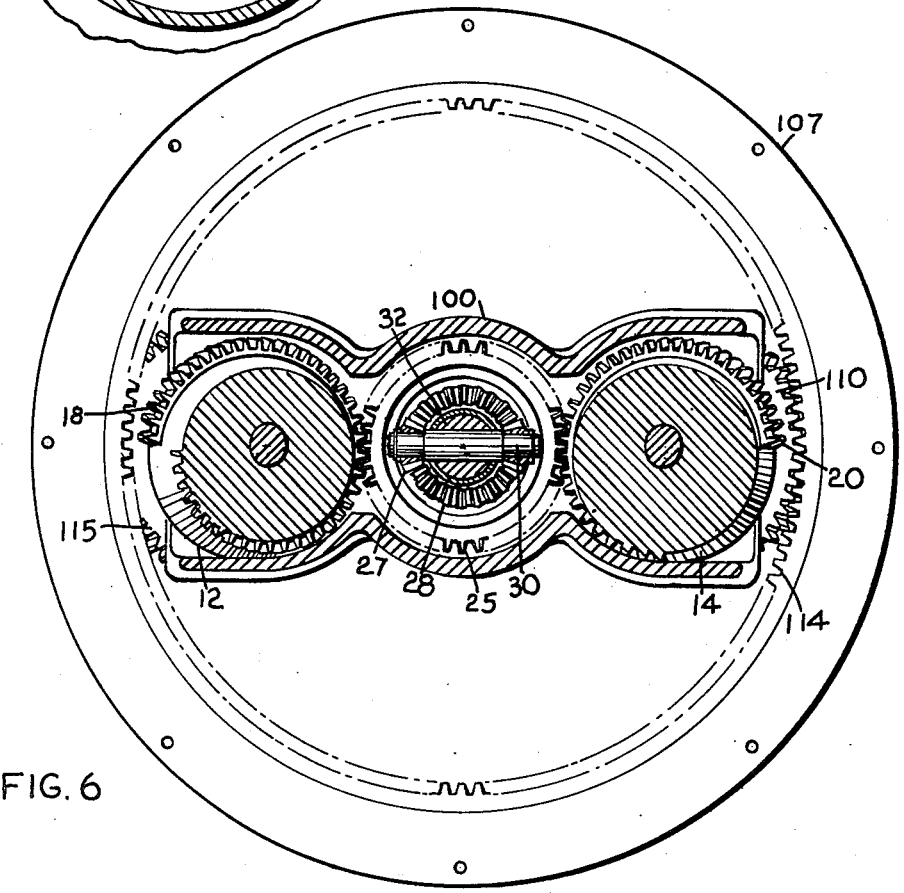
Figure 6 is a cross-sectional view of the planetary embodiment taken along line 6—6 of Figure 4.

With reference to Figure 6, wherein is shown, in cross-section, engagement of the principal components of the invention as illustrated in Figure 4 taken along the line 6—6, the conical members 12 and 14 are shown as mounted on their respective shaft members 116 and 113 in spaced relationship with the central differential shaft member 32. The spur gears of the compensation member 22 are in operable engagement with the conical gear members 12 and 14. Crowned tooth contour has been found desirable in the gearing paths on the conical members.

In operation, the compensator element of the invention, which is operably in contact with conical members having opposite hand spiral toothed paths thereon, is responsive to the speed variations produced by the successively increasing and decreasing diameters of the spiral toothed paths which control the rotation of said compensator member. With reference to the differentially connected gears of said compensator member, each gear is actuated in such a manner that through each revolution of the conical gear members, engagement is effected first from one conical member through 180° and then transferred to the opposite conical member through the remaining 180° of revolution. The rotation of the conical gears being constant, the engaged differentially connected gears of the compensator member vary in rate of turning. That is, one increases its speed in exactly the same ratio as the other decreases its speed, with the result that the speed increase in one differential gear and the speed decrease in the other differential gear resolves into a constant rate of turning of the differential pinion drive p in and the differential shaft member to which it is attached.

As the spiral paths on the opposed conical members cross the center line of the compensation member, each of the differentially connected gears of said compensator member exchange respective engaging conical gears. Such an exchange of engagement of the conical members by the differentially connected gears reverses the acceleration and deceleration of the respective gears, but the variation is resolved into a constant speed insofar as the differential pinion drive pin is concerned.

Various ratios of turning between the conical members and the differential shaft member carrying the differential pinion drive pin of the compensation member are obtained by adjusting the compensation member axially along the surfaces of the conical gear members. This adjustment is made in such a manner as to maintain the relationship of engagement and disengagement of the spiral toothed paths on the conical members with respect to each other and with respect to the compensation member. When the conical gear members are turned in opposite directions and at the same angular relationship with respect to each other, the spiral toothed paths advance parallel to the central axis, in the same direction with respect to each other. Adjustment is accomplished by moving the compensation member axially in conjunction with the simultaneous advance of the spiral toothed paths produced by the opposite and equal rotation of the conical gear members. This adjustment should be made only at two points in the cycle of rotation of the conical gear members in the embodiments herein described. Said points of adjustment occur when the spiral toothed path of each conical gear member is at a central point of engagement with one of each of the compensator gears.

Transmission units incorporating the elements of this invention have been found to be outstanding in their ability to provide a variable speed without slippage and to thereby fulfill a long-felt need for a device which would be positive and variable in this operation.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a variable speed device, the combination of a housing; at least two conical gear elements interconnected by positive drive means in juxtaposition about a central axis; and a differential member in engagement with said conical gear elements on said central axis said differential member including a pair of differentially connected gear members engageable by both of said conical gear elements.

2. In a variable speed device, the combination of a housing; at least two conical gear elements in juxtaposition, spaced about a central axis and interconnected by positive drive means, each of said conical gear elements having at least one constant lead spiral tooth path on the conic surface thereof engageable by both differentially connected gear elements of a central differential member; said spiral tooth path on each conical gear element being of opposite hand to that on another.

3. In a variable speed device, the combination of a housing; at least two conical gear elements in juxtaposition, spaced about a central axis and interconnected by positive drive means, each of said conical gear elements having at least one constant lead spiral tooth path on the conic surface thereof engageable by both differentially connected gear elements of a central differential member, said spiral tooth path on each conical gear element being of opposite hand to that on another; and a centrally disposed differential member in engagement with said conical gear elements, said differential member being axially positionable with respect to said conical gear elements.

4. In a variable speed device, the combination of a housing; at least two conical gear elements interconnected by positive drive means in juxtaposition about a central axis, each of said conical gear elements having at least one constant lead spiral tooth path on the conic surface thereof engageable by both differentially connected gear elements of a central differential member; a centrally disposed differential member in engagement with said conical gear elements, said differential member being axially positionable with hespect to said conical gear elements; and an adjustment means for said differential member.

5. In a variable speed device, the combination of a housing; at least two conical gear elements interconnected by positive drive means in spaced relationship about a central axis, each of said conical gear elements having at least one constant lead spiral tooth path on the conic surface thereof; a differential member in engagement with said conical gear elements, said differential member being axially positionable with respect to said conical gear elements; an adjustment means for said differential member including differentially connected adjustment gear members, and a tubular member keyed thereto.

6. In a variable speed device, the combination of a housing; at least two conical gear elements interconnected by positive drive means in spaced relationship about a central axis, each of said conical gear elements having at least one constant lead spiral tooth path on the conic surface thereof; a differential member in engagement with said conical gear elements, said differential member being axially positionable with respect to said conical gear elements; an adjustment means for said differential member including differentially connected adjustment gear members, and a tubular member differentially keyed thereto.

7. In a variable speed device, the combination of a housing; at least two conical gear elements interconnected by positive drive means in spaced relationship about a central axis, each of said conical gear elements having at least one constant lead spiral tooth path on the conic surface thereof; a differential member in engagement with said conical gear elements, said differential member being axially positionable with respect to said conical gear elements; an adjustable means for said differential member including differentially connected adjustment gear members, and a tubular member differentially keyed thereto and axially fixed to said differential member.

8. In a variable speed device, the combination of a housing; at least two operatively interconnected conical gear elements; a carrier member mounted in said housing and adapted to support said conical gear elements; and a differential member in engagement with said conical gear elements, said differential member including a pair of differentially connected gear members engageable by each of said conical gear elements.

9. In a variable speed device, the combination of a housing; at least two conical gear elements interconnected by positive drive means in juxtaposition about a central axis; a carrier member mounted in said housing and adapted to support said conical gear elements; a differential member in engagement with said conical elements; and an adjustment means for said differential member said differential member including a pair of differentially connected gear members engageable by each of said conical gear elements.

10. In a variable speed device, the combination of a housing; at least two conical gear elements; a carrier member mounted in said housing and adapted to support said conical gear elements; a stationary internal ring gear in engagement with at least one of said conical gear elements; an adjustable ring gear in engagement with at least one of said conical gear elements; and a differential member in engagement with said conical gear elements, said differential member including a pair of differentially connected gear members engageable by each of said conical gear members.

11. In a variable speed device, the combination of a housing; at least two conical gear elements; a carrier member mounted in said housing and adapted to support said conical gear elements; a stationary internal ring gear in engagement with at least one of said conical gear elements; an adjustable ring gear in engagement with at least one of said conical gear elements; and a differential member in engagement with said conical gear elements, said differential member being axially positionable with respect to said conical gear elements and including a pair of differentially connected gear members engageable by each of said conical gear elements; and an adjustment means for said differential member.

12. In a variable speed device, the combination of a housing; at least two conical gear elements; a carrier member mounted in said housing and adapted to support said conical gear elements; a stationary internal ring gear in engagement with at least one of said conical gear elements; an adjustable ring gear in engagement with at least one of said conical gear elements; and a differential member in engagement with said conical gear elements, said differential member being axially positionable with respect to said conical gear elements and including a pair of differentially connected gear members engageable by each of said conical gear elements; and an adjustment means for said differential member including adjustable differential toothed engagement between said housing and said adjustable ring gear.

13. In a variable speed device, the combination of a housing; at least two conical gear elements; a carrier member mounted in said housing and adapted to support said conical gear elements; a stationary internal ring gear in engagement with at least one of said conical gear elements; an adjustable ring gear in engagement with at least one of said conical gear elements; and a differential member in engagement with said conical gear elements, said differential member being axially positionable with respect to said conical gear elements and including a pair of differentially connected gear members engageable by each of said conical gear elements; and an adjustment means for said differential member including adjustable differential toothed engagement between said housing and said adjustable ring gear, and an adjusting member in spiral keyed engagement with said adjustable ring gear.

14. In a variable speed device, the combination of a housing; at least two conical gear elements in juxtaposition and interconnected by positive drive means in spaced relationship about a central axis, each of said conical gear elements having at least one constant lead spiral tooth path on the conic surfaces thereof engageable by both differentially connected gear elements of a central differential member, said spiral tooth path on each conical gear element being of opposite hand to that on another and in planes perpendicular to the central axis, points of identical diameters on each of said conical members being offset; and a centrally disposed differential member in engagement with said conical gear elements including differentially connected gear members, a differential shaft member, at least one differential pinion, and a drive pin element drivably attached to said differential shaft member.

15. In a variable speed device, the combination of a housing; at least two conical gear elements interconnected by positive drive means in spaced relationship about a central axis, each of said conical gear elements having at least one constant lead spiral tooth path on the conic surface thereof, said spiral tooth path on each conical gear element being of opposite hand to that on another; a differential member, in engagement with said conical gear elements, including differentially connected gear members, a differential shaft member, at least one differential pinion, and a drive pin element drivably attached to said differential shaft member, said differential member being axially positionable with respect to said conical gear elements; and an adjustment means for said differential member including differentially connected adjustment gear members, a tubular member axially fixed to said differential member, and differentially keyed to said gear members.

16. In a variabe speed device, the combination of a housing; at least two conical gear elements interconnected by positive drive means in spaced relationship about a central axis, each of said conical gear elements having at least one constant lead spiral tooth path on the conic surface thereof; a rotatable carrier member mounted in said housing and adapted to support said conical gear elements; a stationary internal ring gear in engagement with at least one of said conical gear elements; an adjustable ring gear in engagement with at least one of said conical gear elements; a differential member, said differential member being axially positionable with respect to said conical gear elements and including a pair of differentially connected gear members engageable by each of said conical gear elements; and an adjustment means for said differential member including adjustable differential toothed engagement between said housing and said adjustable ring gear.

17. In a variable speed device, the combination of a housing; at least two conical gear elements interconnected by positive drive means in spaced relationship about a central axis, each of said conical gear elements having at least one constant lead spiral tooth path on the conic surface thereof; a rotatable carrier member mounted in said housing and adapted to support said conical gear elements; a stationary internal ring gear in engagement with at least one of said conical gear elements; an adjustable ring gear in engagement with at least one of said conical gear elements; a differential member in engagement with said conical gear elements, said differential member being axially positionable with respect to said conical gear elements and including a pair of differentially connected gear members engageable by each of said conical gear elements; and an adjustment means for said differential member.

18. In a variable speed device, the combination of a housing; at least two conical gear elements interconnected by positive drive means in spaced relationship about a central axis, each of said conical gear elements having at least one constant lead spiral tooth path on the conic surface thereof, said spiral tooth path on each conical gear element being of opposite hand to that on another; a rotatable carrier member mounted in said housing and adapted to support said conical gear elements; a stationary internal ring gear in engagement with at least one of said conical gear elements; an adjustable ring gear in engagement with at least one of said conical gear elements; a differential member in engagement with said conical gear elements, including a pair of differentially connected gear members engageable by said conical elements, a differential shaft member, at least one differential shaft member, at least one differential pinion, and a drive pin element drivably attached to said differential shaft member, said differential member being axially positionable with respect to said conical gear elements; and an adjustment means for said differential member including adjustable differential toothed engagement between said housing and said adjustable ring gear, and an adjusting member in spiral keyed engagement with said adjustable ring gear.

19. In a variable speed device, the combination of a housing; at least two conical gear elements interconnected by positive drive means in spaced relationship about a central axis; a rotatable carrier member mounted in said housing and adapted to support said conical gear elements; a differential member in engagement with said conical gear elements, said differential member being axially positionable with respect to said conical gear elements and including a pair of differentially connected gear members engageable by each of said conical gear elements; and an adjustment means for said differential member.

References Cited in the file of this patent

UNITED STATES PATENTS

| Number | Name | Date |
|---|---|---|
| 877,765 | Green | Jan. 28, 1908 |
| 1,339,643 | Barr et al. | May 11, 1920 |
| 1,484,197 | Stefani | Feb. 19, 1924 |
| 1,606,867 | Christophel | Nov. 16, 1926 |
| 2,209,023 | Jett | July 23, 1940 |
| 2,234,653 | Rothfeld | Mar. 11, 1941 |

FOREIGN PATENTS

| Number | Country | Date |
|---|---|---|
| 16,792 | Great Britain | July 25, 1906 |
| 380,965 | France | Dec. 23, 1907 |
| 396,768 | Great Britain | Aug. 8, 1933 |
| 539,975 | Germany | Dec. 4, 1931 |